United States Patent [19]
Wheat et al.

[11] Patent Number: 5,386,349
[45] Date of Patent: Jan. 31, 1995

[54] VEHICLE HEADLAMP ASSEMBLY

[75] Inventors: Ronald A. Wheat, Seymour; David R. McMahan, Noblesville; Paul D. Van Duyn, Anderson, all of Ind.

[73] Assignee: General Motors Corporation, Detroit, Mich.

[21] Appl. No.: 172,890

[22] Filed: Dec. 27, 1993

[51] Int. Cl.$^6$ .............................................. B60Q 1/068
[52] U.S. Cl. .......................................... 362/66; 362/61; 362/271; 362/275; 362/419
[58] Field of Search ................... 362/61, 66, 269, 271, 362/275, 287, 418, 419

[56] References Cited

U.S. PATENT DOCUMENTS

| | | | |
|---|---|---|---|
| 4,689,725 | 8/1987 | Saijo et al. | 362/66 |
| 5,067,056 | 11/1991 | Suzuki et al. | 362/66 |
| 5,077,642 | 12/1991 | Lisak | 362/66 |
| 5,091,829 | 2/1992 | Hendrischk et al. | 362/61 |
| 5,138,532 | 8/1992 | Shirai et al. | 362/66 |
| 5,138,533 | 8/1992 | Daumueller | 362/66 |
| 5,138,542 | 8/1992 | Daumueller et al. | 362/420 |
| 5,140,503 | 8/1992 | Lisak | 362/61 |
| 5,186,532 | 2/1993 | Ryder et al. | 362/66 |
| 5,197,799 | 3/1993 | Dehaene | 362/420 |

Primary Examiner—Stephen F. Husar
Assistant Examiner—L. Heyman
Attorney, Agent, or Firm—Ernest E. Helms

[57] ABSTRACT

A headlamp assembly having a recalibration device for providing the correct aim of the headlamp in a horizontal plane and characterized in that the recalibration device includes a transparent member which allows a leveling device to be visible to an observer so as to indicate whether or not the headlamp is in a correct aimed position in a vertical plane.

10 Claims, 3 Drawing Sheets

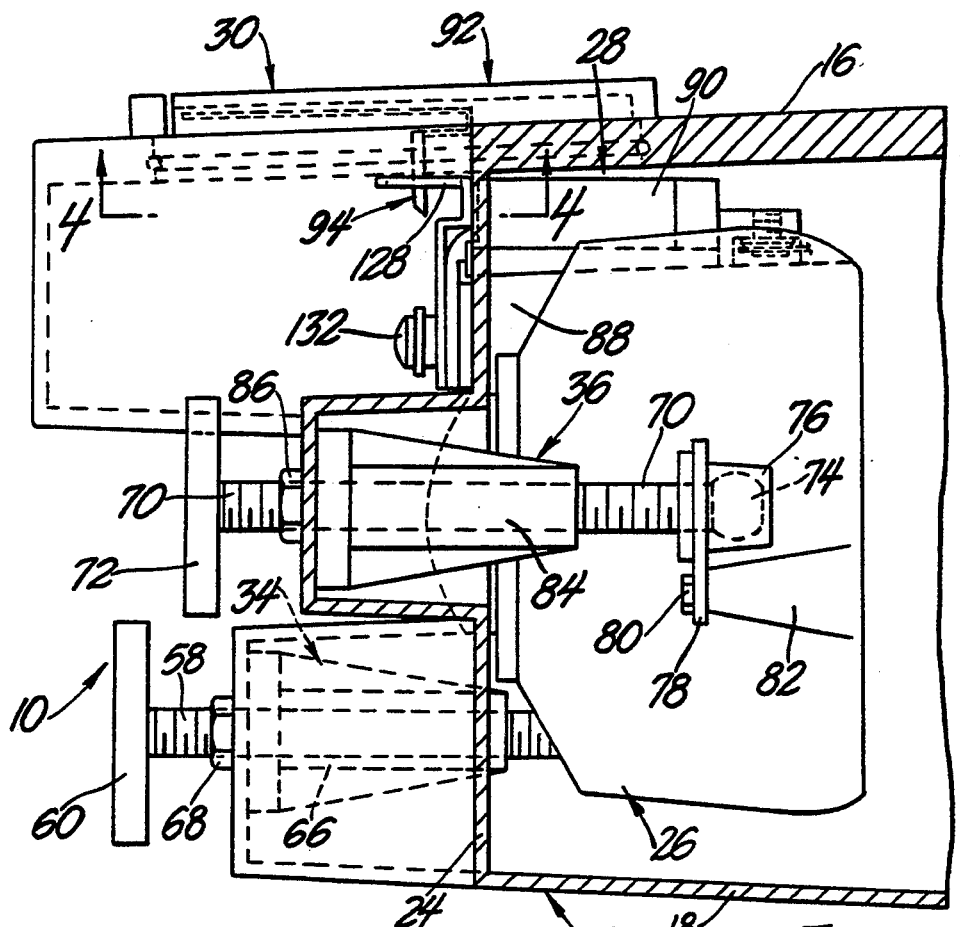
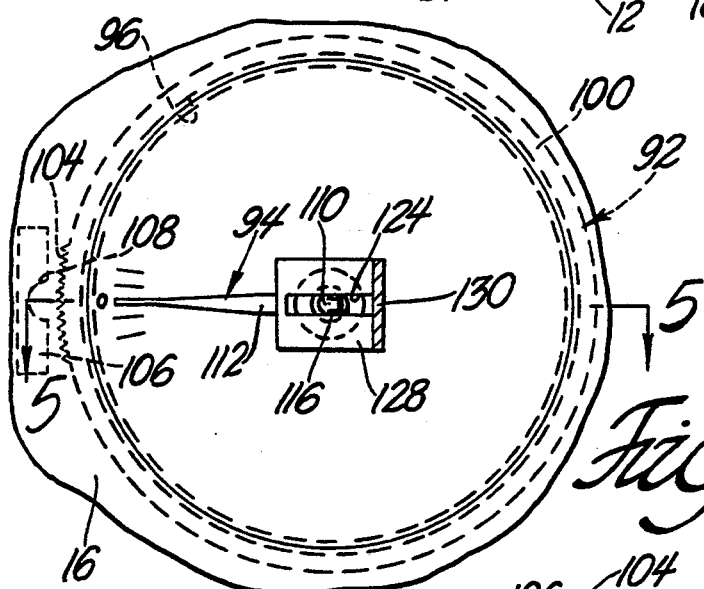
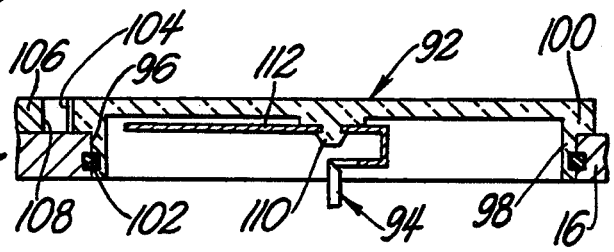

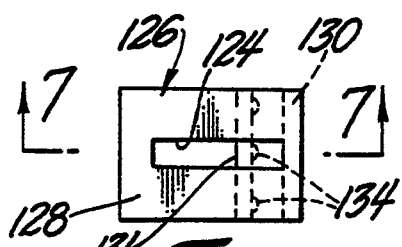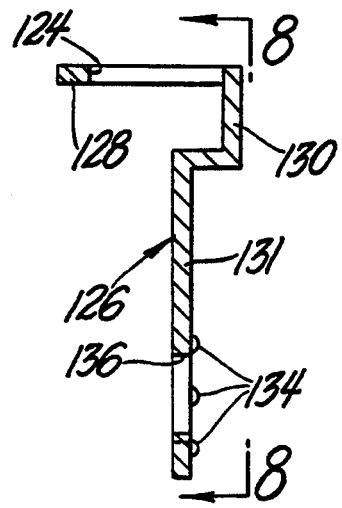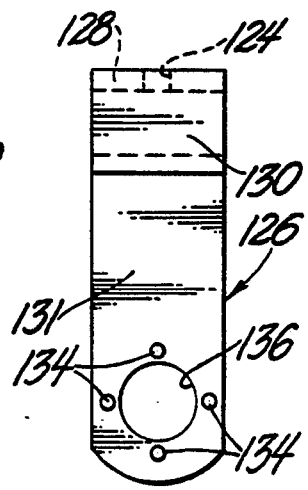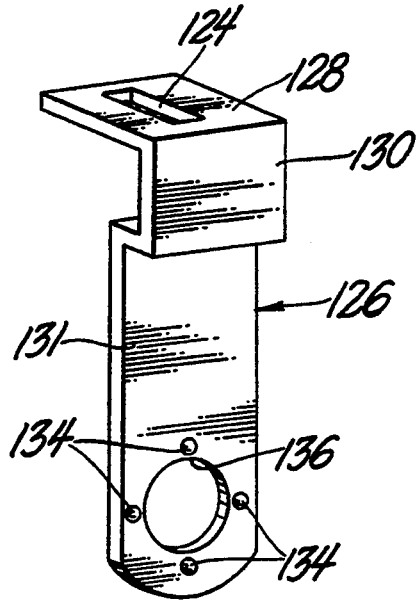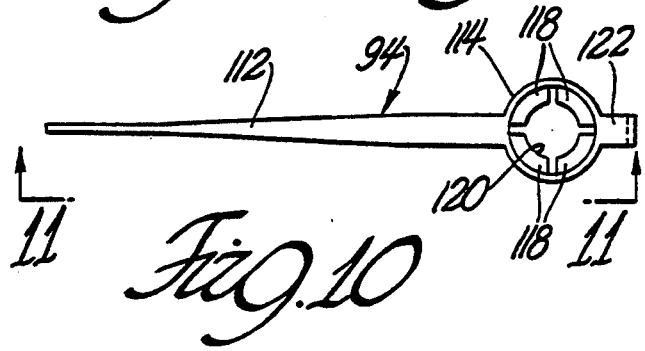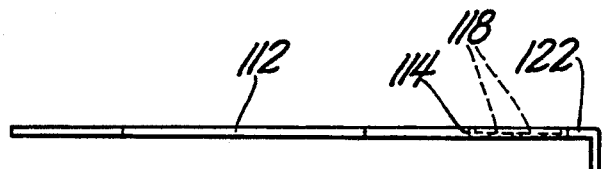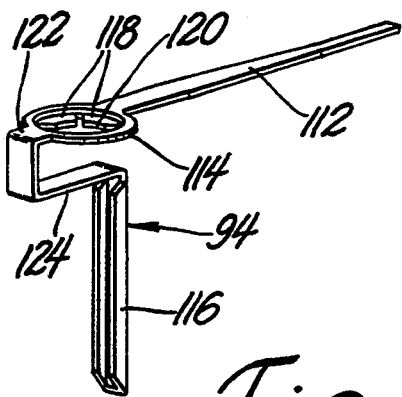

VEHICLE HEADLAMP ASSEMBLY

This invention concerns headlamps in general and, more particularly, relates to a vehicle headlamp assembly provided with a leveling device which serves to indicate when the headlamp is aimed in a vertical plane and is combined with a recalibration device permitting the headlamp to be re-aimed in a horizontal plane.

BACKGROUND OF THE INVENTION

Current U.S. Government regulations require vehicle headlamps to have so-called on-board aiming that includes some form of indicator that will permit a person to observe when the headlamp is out of aim and allow the headlamp to be manually repositioned to the aimed position. In order to comply with these regulations, it is common for vehicle manufacturers to have a leveling device mounted on the headlamp that provides a visual indication when the headlamp is properly aimed in the vertical plane. Some form of indicator is also provided on the headlamp that will permit a person to observe readily when the headlamp is out of aim in the horizontal plane and allow the headlamp to be manually repositioned to the correct aimed position. The latter type of indicator is often referred to as a recalibration device, and it allows a person to re-aim the headlamp in the horizontal plane if the headlamp should move out of the aimed position due to vibrations or other causes.

There have been various arrangements of a leveling device and a recalibration device proposed for use with headlamps, and examples of such arrangements can be seen in U.S. Pat. No. 5,067,056, issued Nov. 19, 1991 in the name of Suzuki et al; U.S. Pat. No. 5,138,532, issued Aug. 11, 1992 in the name of Shirai et al; and U.S. Pat. No. 5,138,542 issued on Aug. 11, 1992 in the name of Daumueller et al. One problem with the prior arrangements of the leveling device and the recalibration device as disclosed in the above-mentioned patents is that, in each instance, the two devices are separated from each other with the leveling device being located in one area of the headlamp assembly and the recalibration device being located in another area of the assembly. As a consequence, during final inspection of a vehicle in a manufacturer's assembly plant, the person making the adjustments for aiming the headlamps must check two separate areas in order to achieve correct aim of a headlamp.

SUMMARY OF THE INVENTION

The present invention is intended to alleviate the problem described above by providing a headlamp assembly which has the leveling device combined with the recalibration device in the same specific region of the headlamp so that both devices can be quickly checked to determine if the headlamp is properly aimed. More specifically, the headlamp assembly according to the invention includes a housing having a reflector supporting a light source adapted to be adjusted in a vertical plane and in a horizontal plane for aiming the light beam provided by the reflector when said light source is energized. The headlamp assembly is provided with a first adjustment device for adjusting the position of the reflector in the vertical plane and a second adjustment device for adjusting the position of the reflector in the horizontal plane. A spirit level is connected to the reflector for indicating when the reflector is properly aimed in the vertical plane, and a recalibration device is located in the same area as the spirit level and is operatively connected to the reflector for allowing the latter to be ,repositioned to the aimed position in the horizontal plane if the reflector moves out of the aimed position. In the preferred form, the recalibration device includes a transparent disk member supported by the housing and having indicia formed thereon with a zero ("0") marking indicating the aimed position of the reflector in the horizontal plane. In addition, the disk member is located in the vicinity of the spirit level so as to allow the latter to be visible through the disk member and thereby provide a visual indication when the reflector is in the aimed position in the vertical plane. Also, a position indicator in the form of a pointer is mounted on the disk member and operatively associated with the reflector to indicate the aimed position of the reflector in the horizontal plane when the pointer is located in line with the zero ("0") marking on the disk member. The arrangement is such that if the reflector should move out of the aimed position in the horizontal plane afterwards, the headlamp can be readily re-aimed through the recalibration device by operation of the second adjustment device.

The objects of the present invention are to provide a new and improved vehicle headlamp assembly having a leveling device for providing correct aim of the headlamp in a vertical plane and a recalibration device for providing correct aim of the headlamp in a horizontal plane and having both devices located in one area of the headlamp; to provide a new and improved vehicle headlamp assembly in which a part of the recalibration device for providing correct aim in a horizontal plane has an operable part thereof formed as a transparent member through which a person can visually view a leveling device which indicates if the headlamp is properly aimed in a vertical plane; to provide a new and improved headlamp assembly having a recalibration device for providing correct aim of the headlamp in a horizontal plane and characterized in that the recalibration device has a transparent disk member which allows a leveling device to be visible to an observer so as to indicate whether or not the headlamp is in a correct aimed position in a vertical plane; to provide a new and improved vehicle headlamp assembly in which the reflector supports a leveling device for indicating the aimed position of the reflector in a vertical plane and also supports a recalibration device for indicating the aimed position of the reflector in a horizontal plane that is located above the leveling device and includes a transparent movable part through which a person can view the leveling device; and to provide a new and improved headlamp assembly having a recalibration device connected to the reflector for indicating when the reflector is out of aim in the horizontal plane and for allowing the reflector to be re-aimed while simultaneously permitting the observer to view through the recalibration device a leveling device which indicates whether or not the reflector is correctly aimed in the vertical plane.

Other objects and advantages of the present invention will be more apparent from the following detailed description when taken with the drawings in which:

BRIEF DESCRIPTION OF THE DRAWINGS

FIG. 3 is a side elevational view of the headlamp assembly taken on line 3—3 of FIG. 1;

FIG. 4 is a view of a part of the recalibration device incorporated with the headlamp assembly and taken on line 4—4 of FIG. 3;

FIG. 5 is a section view taken on line 5—5 of FIG. 4;

FIG. 6 is a plan view of the control member of the recalibration device;

FIG. 7 is a side elevational view of the control member taken on line 7—7 of FIG. 6;

FIG. 8 is a front elevational view of the control member taken on line 8—8 of FIG. 7;

FIG. 9 is a perspective view of the control member seen in FIGS. 6 through 8;

FIG. 10 is a plan view of the position indicator which forms a part of the recalibration device;

FIG. 11 is a side elevational view of the position indicator taken on line 11—11 of FIG. 10; and FIG. 12 is a perspective view of the position indicator seen in FIGS. 10 and 11.

DETAILED DESCRIPTION OF THE INVENTION

Figure 1:
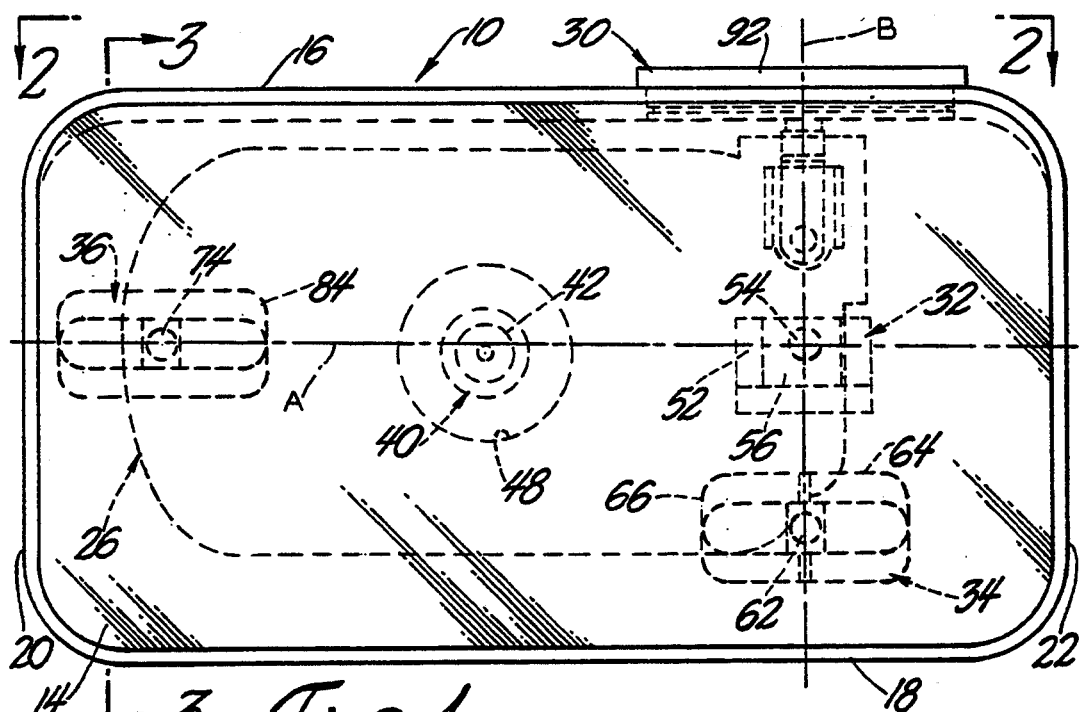
FIG. 1 is a front elevational view of a headlamp assembly combined with a leveling device and a recalibration device in accordance with the present invention.
Figure 2:
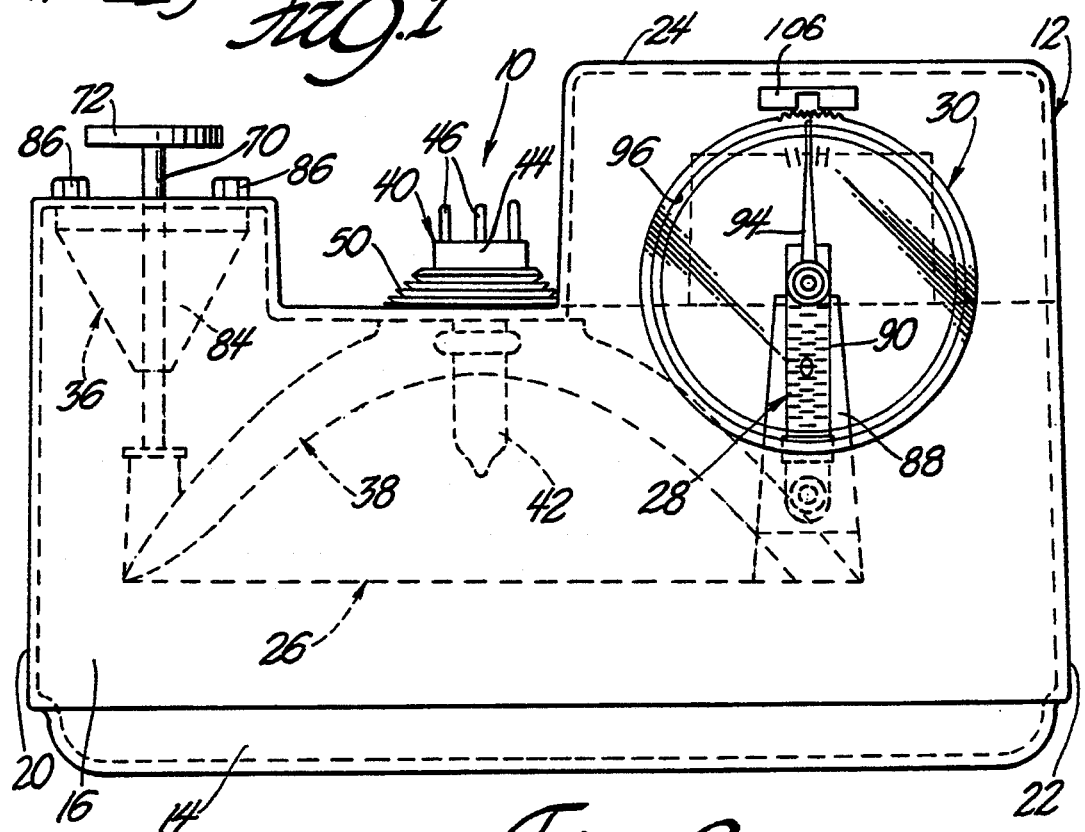
FIG. 2 is a plan view of the headlamp assembly taken on line 2—2 of FIG. 1.

Referring now to the drawings and more particularly FIGS. 1 through 3 thereof, a vehicle headlamp assembly 10 according to the present invention is shown of the replaceable light bulb composite type. The headlamp assembly 10 includes a housing 12 having the front end thereof closed by a lens 14 which can be made of glass or a plastic material. The housing 12 includes a top wall 16, a bottom wall 18, laterally spaced side walls 20 and 22, and a stepped back wall 24 that together with the lens 14 provide a substantially closed chamber for an internally adjustable reflector member 26. The reflector member 26 is supported for movement relative to the housing 12 about a horizontal aim axis "A" and a vertical aim axis "B". A leveling device 28 is mounted on the reflector member 26 for indicating when the latter is aimed in a vertical plane about the horizontal aim axis "A", and a recalibration device 30 is supported by the housing 12 and operatively connected to the reflector member 26 for indicating when the latter is aimed in a horizontal plane about the vertical aim axis "B".

In this regard, the reflector member 26 is supported by a fixed ball pivot member 32, an adjustment device 34 for positioning the reflector member 26 about the horizontal aim axis "A", and an adjustment device 36 for positioning the reflector member 26 about the vertical aim axis "B". The ball pivot member 32 and the adjustment devices 34 and 36 are mounted on a rear wall portion 24 of the housing 12 and the entire assembly is designed as a self-contained unit which can be shipped to a vehicle manufacturer and thereafter mounted to the sheet metal structure at the front end of a motor vehicle. Once mounted in the vehicle, the reflector member 26 can be selectively adjusted for aiming purposes by the adjustment device 34 for aiming the reflector member 26 in a horizontal plane containing the horizontal aim axis "A" and also be adjusted by the adjustment device 36 for aiming the reflector member 26 in a vertical plane containing the vertical axis "B".

The reflector member 26 is made of a plastic material and is formed with a parabolic cavity, the inner surface 38 of which is aluminized so as to provide a mirror-type finish on such surface for projecting a light beam forwardly of the vehicle. A replaceable light bulb assembly 40 is mounted in the reflector member 26 and includes a light bulb 42 having the filament thereof connected through a molded plug body 44 to a plurality of prong-type conductors 46. Although not shown and as is conventional, the conductors 46 of the light bulb assembly 40 are adapted to be electrically connected to a wire harness providing electrical power for lighting the light bulb when a suitable switch on the instrument panel of the vehicle is operated by the driver of the vehicle. The plug body 44 of the light bulb assembly 40 extends through an enlarged opening 48 in a rear wall portion 24 of the housing 12 and is connected with a rubber bellows 50 which allows relative movement of the light bulb assembly 40 during adjustment of the reflector member 26 while at the same time sealing the interior of the housing 12 from dust and the entry of splash water.

As indicated above, the ball pivot member 32 and the adjustment devices 34 and 36 serve to support the reflector member 26 and allow selective positioning thereof about the horizontal aim axis "A" and the vertical aim axis "B". It will be noted that as seen in FIG. 1, the ball pivot member 32 takes the form of a ball stud, the rear end of which is fixed by a bracket 52 to a rear wall portion 24 of the housing 12 and the front end of which is formed with a ball pivot 54 received within a ball socket 56 fixed with the rear of the reflector member 26. Thus, the ball pivot 54 provides a fixed pivot point at the intersection of the horizontal aim axis "A" and the vertical aim axis "B" about which the reflector member 26 can be pivoted by the adjustment devices 34 and 36.

In this connection, the adjustment device 34 includes a threaded shaft 58, the rear end of which is fixed with a knob 60 and the front end of which is formed with a ball pivot 62 seen in FIG. 1. As in the case of the fixed ball pivot member 32, the ball pivot 62 is received within a ball socket 64 which, in this instance, is attached to the lower rear portion of the reflector member 26. The shaft 58 is threadably received within a nut member 66 secured to a rear wall portion 24 of the housing 12 by a pair of cap screws 68 so that rotation of the knob 60 results in longitudinal movement of the shaft 58 and, in turn, movement of the reflector member 26 in a vertical plane about the horizontal aim axis "A".

The adjustment device 36 incorporated in the headlamp assembly 10 provides fore and aft movement of the outboard end of the reflector member 26 resulting in adjustable positioning and aiming thereof about the vertical axis "B" in a horizontal plane. As in the case of the adjustment device 34, the adjustment device 36 includes a threaded shaft 70, the rear end of which is secured to a knob 72 and the from end of which is formed with a ball pivot 74. The ball pivot 74 is located within a ball socket 76 mounted on a bracket 78, which in turn is secured by a cap screw 80 to a boss 82 integrally formed with and projecting rearwardly from the reflector member 26. The shaft 70 is threadably received within a nut member 84 secured to a rear wall portion 24 of the housing 12 by a pair of cap screws 86. Thus, by rotating the knob 72, the shaft 70 moves longitudinally, causing the reflector member 26 to move in a horizontal plane about the vertical aim axis "B".

As mentioned above, a leveling device 28 is mounted on the reflector member 26 for indicating the aimed position of the reflector member 26 in a vertical plane about the horizontal aim axis "A". As seen in FIGS. 2 and 3, the leveling device 28 is mounted on a boss 88 which is integrally formed with and extends rearwardly from the reflector member 26. The boss 88 is located at the upper portion of the reflector member 26 so as to position the leveling device 28 along the vertical aim axis "B" as seen in FIG. 1. In this instance, the leveling device 28 takes the form of a spirit level 90 provided with a clear plastic body having a chamber formed therein. As best seen in FIG. 2 and as is conventional, the chamber is filled with a viscous fluid entrapping a gas bubble which moves within the confines of the chamber as the position of the reflector member 26 is adjusted in a vertical plane by the adjustment device 34. Although not shown, it will be understood that the leveling device 28 will have an adjusting screw incorporated therewith which allows adjustment of the spirit level 90 during manufacture of the headlamp assembly 10 to indicate the aimed position of the reflector member 26 relative to the optical axis thereof. Thus, after installation of the headlamp assembly 10 in a vehicle, the reflector member 26 can be placed in the aimed position in a vertical plane by turning the knob 60 of the adjustment device 34 until the gas bubble is in the center position of the chamber as seen in FIG. 2.

As alluded to hereinbefore, the recalibration device 30 is located in the same area of the headlamp assembly 10 as the leveling device 28. More specifically and as seen in FIG. 2, the recalibration device 30 is located directly above the leveling device 28 and includes a disk member 92 supporting a position indicator 94 which is responsive to movement of the reflector member 26 in a horizontal plane about vertical aim axis "B".

As seen in FIGS. 3 through 5, the disk member 92 is made of a clear plastic material and is mounted within a circular opening 96 formed in the top wall 16 of the housing 12. The disk member 92 is integrally formed with a circular skirt 98 located radially inwardly from the periphery of the disk member 92 so as to provide a circular shoulder 100 which sits on the upper surface of the top wall 16. The cylindrical vertical surface of the top wall 16 that defines the opening 96 is formed with an annular groove which is directly opposite a similar groove formed in the periphery of the skirt 98 of the disk member 92. An "O" ring 102 made of rubber or the like is carried by the groove in the skirt of the disk member and has its outer portion located in the groove of the cylindrical vertical surface defining the opening 96. In addition, the upper surface of the disk member is formed with indicia which provides a zero ("0") marking as seen in FIG. 4. Also, the periphery of the shoulder 100 adjacent the indicia is formed with a plurality of teeth 104. A guide block 106, secured to the top wall 16 of the housing 12, is formed with a guide opening 108 for accommodating the work end of a hand tool, such as a TORX screwdriver, for engaging the teeth 104 and rotating the disk member 92 relative to the top wall 16. Thus, the "O" ring 102 serves to maintain the disk member 92 within the opening 96 and allows the disk member 92 to be rotated by the aforementioned tool about a vertical axis. The "O" ring 102 also serves to seal the opening 96 and prevent foreign matter from gaining access to the interior of the housing 12.

As seen in FIG. 5, the inner surface of the disk member 92 is integrally formed with a downwardly depending projection 110 which is frustoconical in cross section and has a shaft portion adjacent the lower surface of the disk member 92 that serves as a gudgeon about which the position indicator 94 can rotate. The position indicator 94 can be made of sheet metal or plastic and, as seen in FIGS. 10 through 12, includes a pointer section 112, a hub section 114, and a control section 116. The hub section 114 is circular in configuration and has four identical arcuate tabs 118 formed therewith which define a circular opening 120 which in size corresponds to the size of the shaft portion of the projection 110. The arcuate tabs 118 are flexible so that the hub section 114 of the position indicator 94 can be snapped over the enlarged frustoconical part of the projection 110 and be located on the shaft portion thereof as seen in FIG. 5.

As seen in FIGS. 11 and 12, the hub section 114 of the position indicator 94 is formed with a foot 122 which is in line with and located in the same plane as the pointer section 112 and the hub section 114. The foot 122 is connected by a reversely bent leg 124 which, in turn, is connected to the control section 116 of the position indicator 94. As seen in FIGS. 3 and 4, the control section 116 is received within a slot 124 formed in a bracket 126 fastened to the rear end of the boss 88 supporting the leveling device 28. As seen in FIGS. 6 through 8, the bracket 126 includes a generally rectangular horizontal portion 128 having the slot 124 formed therein. The portion 128 is integral with depending offset legs 130 and 131, the latter of which is fastened to the aforementioned boss 88 by a screw 132. The leg 131 is also formed with four circumferentially equally spaced projections 134 which surround an opening 136 through which the screw 132 extends for securing the bracket 126 to the boss 88. Although not shown, it will be understood that the projections 134 are adapted to be received within four openings of similar size formed in the end of the boss 88 for proper positioning of the bracket 126 on the boss 88. The projections 134 also serve to prevent the bracket from turning about the longitudinal axis of the screw 132.

It will be noted that the slot 124 in the bracket 126 is positioned so that its longitudinal center axis is in line with the longitudinal center axis of the spirit level 90. Moreover, the longitudinal center axis of the slot 124 is located in a plane containing the vertical aim axis "B". Accordingly, any movement of the reflector member 26 in a vertical plane about the horizontal aim axis "A" will cause the bracket 126 to move up or down without disturbing the position of the control section 116 of the position indicator 94. The position indicator 94, therefore, maintains its pre-established position when the knob 60 of the adjustment device 34 is rotated in one direction or the other. On the other hand, movement of the reflector member 26 in a horizontal plane about the vertical aim axis "B" will cause the bracket 126 to move and, through the connection with the slot 124, moves the control section 116 which, in turn, causes the pointer section 112 of the position indicator 94 to rotate relative to the disk member 92 and about the support portion of the projection 110.

As seen in FIGS. 2 and 4, the tip of the pointer section 112 is located in line with the zero ("0") marking of the indicia on the disk member 92 and, therefore, indicates to the observer that the reflector member 26 is in the properly aimed position in the horizontal plane. This properly aimed position of the reflector member 26 in the horizontal plane would normally be achieved during the final inspection of the vehicle in the vehicle manufacturer's assembly plant. In order to do so, a mechanical aimer is used to obtain the initial properly aimed position of the reflector member 26 in the horizontal plane by rotating the knob 72 of the adjustment device 36 until the desired aim position is obtained.

While doing so, the control section 116 of the position indicator 94 will be moved by the bracket 126, causing the pointer section 112 to rotate relative to the indicia on the disk member 92. Once the properly aimed position is realized, the work end of the TORX screwdriver will be inserted into the guide opening 108 within the guide block 106 so as to engage the teeth 104 and, as a result of manual rotation of the screwdriver, cause the disk member 92 and zero ("0") marking on the disk member 92 to be rotated until it is aligned with the new position of the tip of the pointer section 112 of the position indicator 94. This adjustment of the disk member 92 will then indicate the correct aimed position of the reflector member 26 in the horizontal plane. After the vehicle leaves the assembly plant, if the reflector member 26 should be found to be out of proper aimed adjustment due to vibrations or inadvertent rotation of the knob 72 causing the tip of the pointer section 112 to be displaced relative to the zero ("0") marking, it will be a simple matter for the vehicle owner to re-aim the headlamp by rotating the knob 72 in the proper direction to cause the tip of the pointer section 112 to be again in line with the zero ("0") marking.

It should be apparent from the above description that the present invention allows both the leveling device 28 and the recalibration device 30 to be located in one area of the reflector member 26 rather than being separated as found in prior headlamp arrangements. Since the disk member 92 of the recalibration device 30 is made of clear plastic and is therefore transparent, it allows a person to view the spirit level 90 and determine whether the reflector member 26 is aimed properly in a vertical plane. At the same time, one can determine quickly by viewing the position indicator 94 if the reflector member 26 is correctly aimed in the horizontal plane. By having the two devices 28 and 30 located in the same area, aiming of the reflector member 26 can be greatly facilitated during assembly of the vehicle and afterwards.

Various changes and modifications can be made in the construction of the headlamp assembly described above without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. In combination with a headlamp assembly including a housing provided with a reflector supporting a light source adapted to be adjusted in a vertical plane and in a horizontal plane for aiming the light beam provided by said reflector when said light source is energized, a first adjustment device for adjusting the position of said reflector in said vertical plane, a second adjustment device for adjusting the position of said reflector in said horizontal plane, a spirit level connected to said reflector for indicating when the reflector is properly aimed in said vertical plane, a recalibration device operatively connected to said reflector for allowing said reflector to be repositioned to the aimed position in the horizontal plane if the reflector moves out of the aimed position, said recalibration device including a transparent disk member supported by said housing and indicia with a zero ("0") marking indicating the aimed position of the reflector in said horizontal plane, said disk member being located adjacent said spirit level so as to allow the latter to be visible through said disk member and thereby provide a visual indication when said reflector is in the aimed position in said vertical plane, and a position indicator in the form of a pointer operatively associated with said reflector so as to indicate the aimed position of the reflector in the horizontal plane when said pointer is located in line with said zero ("0") marking on said disk member and allowing said reflector to be re-aimed by said second adjustment device if said reflector should move out of said aimed position in said horizontal plane.

2. In combination with a headlamp assembly including a housing provided with a reflector supporting a light source adapted to be adjusted in a vertical plane about a horizontal aim axis and in a horizontal plane about a vertical aim axis for aiming the light beam provided by said reflector when said light source is energized, a first adjustment device for adjusting the position of said reflector in said vertical plane, a second adjustment device for adjusting the position of said reflector in said horizontal plane, a spirit level connected to said reflector for indicating when the reflector is properly aimed in said vertical plane, a recalibration device operatively connected to said reflector for allowing said reflector to be repositioned to the aimed position in the horizontal plane if the reflector moves out of the aimed position, said recalibration device including a transparent member supported by said housing and having indicia formed thereon with a zero ("0") marking indicating the aimed position of the reflector in said horizontal plane, said member being located adjacent said spirit level so as to allow the latter to be visible through said member and thereby provide a visual indication when said reflector is in the aimed position in said vertical plane, and a position indicator mounted on said member and operatively associated with said reflector so as to indicate the aimed position of the reflector in the horizontal plane and allowing said reflector to be re-aimed by said second adjustment device if said reflector moves out of said aimed position in said horizontal plane.

3. In combination with a headlamp assembly including a housing provided with a reflector supporting a light source adapted to be adjusted in a vertical plane about a horizontal aim axis and in a horizontal plane about a vertical aim axis for aiming the light beam provided by said reflector when said light source is energized, a first adjustment device for adjusting the position of said reflector in said vertical plane, a second adjustment device for adjusting the position of said reflector in said horizontal plane, a spirit level connected to said reflector for indicating when the reflector is properly aimed in said vertical plane, a recalibration device operatively connected to said reflector for allowing said reflector to be repositioned to the aimed position in the horizontal plane if the reflector moves out of the aimed position, said recalibration device including a transparent member supported by said housing for indicating the aimed position of the reflector in said horizontal plane, said member being located adjacent said spirit level so as to allow the latter to be visible through said member and thereby provide a visual indication when said reflector is in the aimed position in said vertical plane, and a position indicator operatively associated with said member and said reflector so as to indicate the aimed position of the latter in the horizontal plane and allowing said reflector to be re-aimed by said second adjustment device if said reflector moves out of said aimed position in said horizontal plane.

4. The headlamp assembly set forth in claim 3 wherein said transparent member is rotatably supported by said housing above said leveling device and has the form of a disk with indicia formed thereon.

5. The headlamp assembly set forth in claim 4 wherein said position indicator includes a pointer section supported by said member for rotation relative to said indicia and about an axis normal to the plane of said member.

6. The headlamp assembly set forth in claim 5 Wherein said position indicator has a control section connected to said reflector by a bracket formed with a slot for accommodating said control section.

7. The headlamp assembly set forth in claim 6 wherein said slot has the longitudinal center axis thereof located in said plane passing through said vertical aim axis so that operation of said first adjustment device permits said reflector to be adjusted in said vertical plane without causing movement of said control section of said position indicator.

8. The headlamp assembly set forth in claim 7 wherein the longitudinal center axis of said spirit level and the longitudinal center axis of said slot are located in said plane passing through said vertical aim axis.

9. The headlamp assembly set forth in claim 8 wherein the periphery of said transparent member is provided with teeth and said housing has guide means formed therewith for receiving the work end of a hand tool that engages said teeth for repositioning said member.

10. The headlamp assembly set forth in claim 9 wherein said housing is formed with a circular opening for accommodating said transparent member and the latter is provided with means for sealing said opening.

* * * * *